No. 725,543. PATENTED APR. 14, 1903.
P. P. CRAVEN.
APPARATUS FOR CUTTING APPLIQUÉ LACE, &c.
APPLICATION FILED NOV. 14, 1902.
NO MODEL. 2 SHEETS—SHEET 1.

Witnesses. Inventor.
Vernon Wood. Phinehas Pearson Craven
Jas Stewart Broadfoot

No. 725,543. PATENTED APR. 14, 1903.
P. P. CRAVEN.
APPARATUS FOR CUTTING APPLIQUÉ LACE, &c.
APPLICATION FILED NOV. 14, 1902.
NO MODEL. 2 SHEETS—SHEET 2.

Witnesses.
Vernon Wood
Jas Stewart Broadfoot

Inventor.
Phinchas Pearson Craven

UNITED STATES PATENT OFFICE.

PHINEHAS PEARSON CRAVEN, OF ARDWICK, MANCHESTER, ENGLAND.

APPARATUS FOR CUTTING APPLIQUÉ LACE, &c.

SPECIFICATION forming part of Letters Patent No. 725,543, dated April 14, 1903.

Application filed November 14, 1902. Serial No. 131,375. (No model.)

*To all whom it may concern:*

Be it known that I, PHINEHAS PEARSON CRAVEN, a subject of the King of Great Britain, residing at Ardwick, Manchester, England, have invented certain new and useful Improvements in Apparatus for Cutting Appliqué Lace and the Like; and I do hereby declare the following to be a full, clear, and exact description of the invention, such as will enable others skilled in the art to which it appertains to make and use the same.

This invention has for its object improvements in apparatus connected with the cutting out of the pattern of appliqué lace or that kind of lace consisting of two or more fabrics, part of which is cut away to form the pattern, and relates to devices for supporting the material while being operated upon by the scissors or shears employed in effecting the cutting out, and in order that the said invention may be fully understood I will proceed to describe the same with the aid of the accompanying two sheets of drawings, in which—

Figure 1:
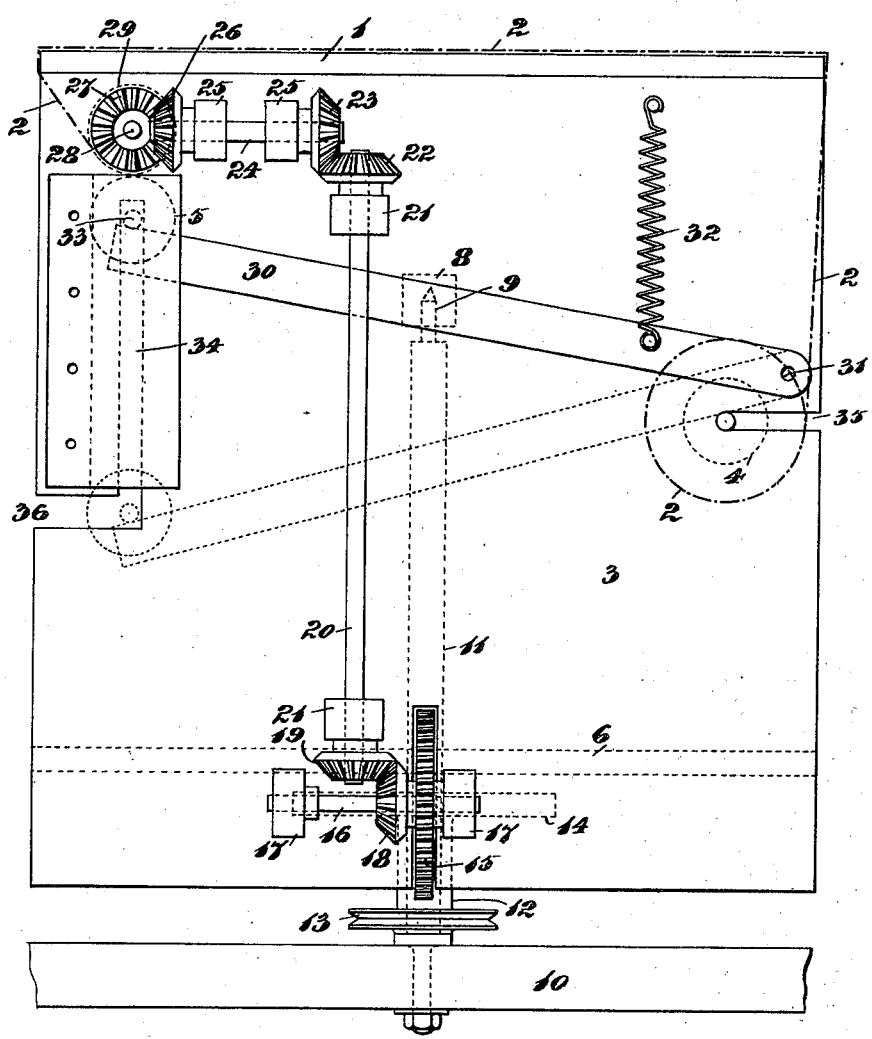
Figure 2:
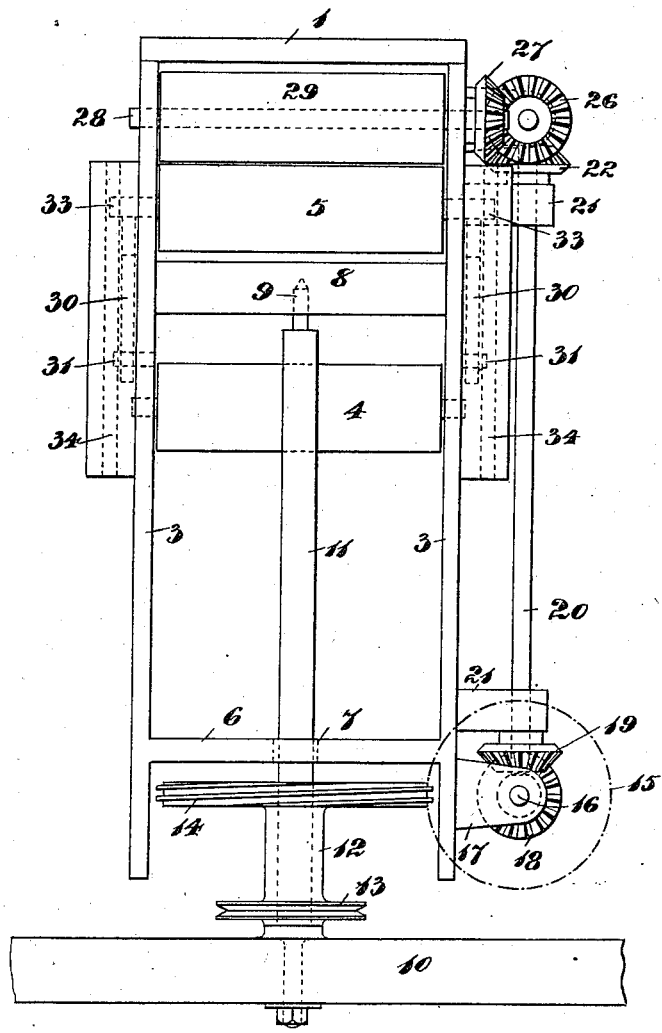

Figure 1 is a side elevation of a table for supporting the material while being operated upon by the scissors or shears, and Fig. 2 an end view of same looking from left to right in Fig. 1.

The drawings show a table and mechanism connected therewith capable of being rotated to any required extent and intended to support the material while it is being operated upon by the cutting mechanism and to facilitate the use of such mechanism.

1 represents the flat top of the table, over which is passed the material 2 to be operated upon. This flat top 1 may be provided with side pieces 3 or other parts adapted to carry two rollers 4 and 5, onto one of which, 4, the material to be operated upon is wound before the cutting operation is effected and onto the other of which, 5, the material is wound by mechanism to be hereinafter described after the cutting operation has been effected.

6 is a cross-piece fixed at the lower part of the side pieces 3 and having in it a hole 7.

8 is another cross-piece fixed to the upper part of the table and provided with a recess 9. On a suitable base or support 10 is fixed a vertical stud or pillar 11, which passes through the hole 7 in the cross-piece 6 and into the recess 9 of the cross-piece 8, so that the whole weight of the table rests on the upper end of the vertical stud 11 and is free to turn or swivel upon it.

12 is a sleeve which fits loosely on and is free to revolve on the stud 11.

13 is a grooved pulley and 14 a worm, both of which are fixed on or formed with the sleeve 12. The worm 14 gears with the worm-wheel 15, fixed on a shaft 16, revolving in bearings 17 on one of the side pieces 3. The shaft 16 has fixed on it a toothed wheel 18, gearing with a toothed wheel 19, fixed on a vertical shaft 20, revolving in bearings 21 on the same side piece 3. On this shaft 20 is fixed another toothed wheel 22, which gears with a toothed wheel 23, fixed on a shaft 24, turning in bearings 25 also on the same side piece 3. On this shaft 24 is fixed a toothed wheel 26, which gears with a toothed wheel 27, fixed on the axis 28 of a friction-roller 29, the surface of which is covered with powdered glass or is otherwise roughened. The roller 5 is pressed up against the roller 29 by means of levers 30, pivoted at 31 to the side pieces 3 and constantly drawn upwardly by means of springs 32. These levers act against the under side of the gudgeons 33 of the roller 5, which gudgeons are free to move up or down in the guide-grooves 34.

It will now be understood that the material to be operated upon is first wound onto the roller 4, the gudgeons of which rotate in the notches 35 of the side pieces 3, and the end of the material is carried over the top 1 of the table and is connected to the roller 5 after being passed between such roller and the surface of the friction-roller 29. If now the grooved pulley 13 is caused to rotate by means of a cord or gut band, for example, rotatory motion will be imparted to the friction-roller 29 by means of the gearing 14, 15, 16, 18, 19, 20, 22, 23, 24, 26, and 27, and the material 2 will thereby be drawn forward over the table-top and wound at a uniform speed onto the roller 5, which can then be removed by pressing it downward till its gudgeons reach the notches 36 in the side pieces 3, when it can be withdrawn, with the cut material upon it. At the same time that the material is being thus drawn over the top of the table the latter can be turned around on the stud 11 to any desired angle, so that by moving the table with one hand and holding the cutting mechanism in any required position with the other the compound movement of table and cutting mechanism will enable the operator to cut the material to any angle or curve that may be necessary in order to follow the pattern to be cut out.

The driving mechanism above described effects the automatic drawing forward and winding up of the material as the cutting proceeds; but, if desired, the automatic drawing-forward and winding-up devices may be dispensed with, and instead thereof the material may be drawn forward and wound onto the roller 5 after having been cut by means of a crank or other suitable handle applied to the axis of the said roller and operated by hand; or, again, in cases where it is not convenient or practicable to wind the material onto rollers it may be stretched over the table and temporarily fixed thereto with pins or otherwise while being operated upon with the cutting mechanism and then released and a fresh part brought forward, fixed, and operated upon, and so on.

I do not confine myself to the particular kind or arrangement of gearing shown for the purpose of drawing forward and winding up the material automatically, as the same may be varied without departing from the nature of my invention.

I claim—

1. In a cutting-table, a supporting pillar or post, a table rotatably mounted thereon, supply and winding rollers for the material to be operated upon, a driving-wheel journaled on said post adapted to be driven from an external prime mover and driving connections between said driving-wheel and the winding-roller, substantially as described.

2. In a cutting-table, a supporting pillar or post, a table rotatably mounted thereon, supply and winding rollers carried at opposite sides of said table, a band wheel or pulley and a worm journaled on said pillar, a worm-wheel on the table-frame meshing with said worm, and driving connections between said worm-wheel and the winding-roller, substantially as described.

3. In combination, a rotatable table having a flat top and vertical side members, a supply-roller removably journaled at one side of said members below the table-top, a winding-roller removably journaled at the other side below the table-top, and frictional means for operating said winding-roller, substantially as described.

4. In combination, a rotatable table having vertical side members, a supply-roller journaled in open-end slots in said members at one side of the table, a winding-roller journaled in open-end slots in said members at the opposite side, a driving-roller journaled in said side members with means for operating it, and spring-pressed means for pressing said winding-roller into contact with said driving-roller, substantially as described.

In witness whereof I have hereunto set my hand in presence of two witnesses.

PHINEHAS PEARSON CRAVEN.

Witnesses:
VERNON WOOD,
JAS. STEWART BROADFOOT.